United States Patent [19]
Pontes et al.

[11] Patent Number: 5,100,469
[45] Date of Patent: Mar. 31, 1992

[54] INK COMPOSITIONS HAVING DECREASED DRYING TIMES

[75] Inventors: Fatima M. Pontes; Marcel P. Breton; Raymond W. Wong, all of Mississauga; Kerstin Henseleit, Toronto; Melvin D. Croucher, Oakville, all of Canada

[73] Assignee: Xerox Corporation, Stamford, Conn.

[21] Appl. No.: 701,272

[22] Filed: May 16, 1991

[51] Int. Cl.$^5$ .............................................. C09D 11/02
[52] U.S. Cl. ...................................... 106/20; 106/22; 106/25
[58] Field of Search ....................... 106/27, 22, 23, 25, 106/20; 524/513, 840; 426/548

[56] References Cited

U.S. PATENT DOCUMENTS

| | | | |
|---|---|---|---|
| 4,072,462 | 2/1978 | Vellins et al. | 8/2.5 A |
| 4,074,034 | 2/1978 | Soga et al. | 526/56 |
| 4,150,997 | 4/1979 | Hayes | 106/15.05 |
| 4,154,618 | 5/1979 | Burke | 106/27 |
| 4,163,001 | 7/1979 | Carumpalos et al. | 200/29.6 |
| 4,352,691 | 10/1982 | Owatari et al. | 106/20 |
| 4,378,564 | 3/1983 | Cross et al. | 346/75 |
| 4,508,570 | 4/1985 | Fujii et al. | 106/20 |
| 4,530,961 | 7/1985 | Nguyen et al. | 524/832 |
| 4,659,382 | 4/1987 | Kang | 106/22 |
| 4,740,549 | 4/1988 | Okuzono et al. | 524/379 |
| 4,789,400 | 12/1988 | Solodar et al. | 106/22 |
| 4,836,852 | 6/1989 | Knirsch et al. | 106/22 |
| 4,838,938 | 6/1989 | Tomida et al. | 106/22 |
| 4,847,316 | 7/1989 | Schick et al. | 524/88 |
| 4,853,036 | 8/1989 | Koike et al. | 106/20 |
| 4,886,677 | 12/1989 | Kondou | 426/548 |
| 4,889,877 | 12/1989 | Seitz | 523/161 |
| 4,912,154 | 3/1990 | Arora et al. | 524/840 |
| 4,923,515 | 5/1990 | Koike et al. | 106/22 |

OTHER PUBLICATIONS

C. A. Bruce, "Dependence of Ink Jet Dynamics on Fluid Characteristics" IBM J. Res. Develop., pp. 258–270, May, 1976.
B. L. Beach et al., "Materials Selection for an Ink Jet Printer," Ink Jet Printer Materials, pp. 75–80, Jan., 1977.
C. T. Ashley, "Development and Characterization of Ink for an Electrostatic Ink Jet Printer", Jet Printer Ink, pp. 69–74, Jan., 1977.
A. Naka et al., "Ability of Surfactants to Form Highly Loaded Coal–Water Mixtures" JAOCS, vol. 65, No. 7 (Jul. 1988), pp. 1194–1201.
"The Jeffamine Polyoxyalkyleneamines"–Texaco Chemical Company, 1987, M. Ozaki et al., Fixing Time of Ink-Jet Inks on Plain Paper SPIE, vol. 1079 Hard Copy Output (1989), pp. 384–388.
Alkateric–Amphoterics, pp. 18–19.
Rexol 130–Technical Bulletin TM-86-008, pp. 1–4.

Primary Examiner—William R. Dixon, Jr.
Assistant Examiner—Helene Klemanski
Attorney, Agent, or Firm—Oliff & Berridge

[57] ABSTRACT

An ink composition which is especially useful for ink jet printing contains a colorant, a liquid carrier and at least one additive selected from the group consisting of meso-erythritol, $RC(CH_2OH)_3$ and salts thereof, wherein R is a member selected from the group consisting of $NH_2$ and alkyl.

19 Claims, No Drawings

INK COMPOSITIONS HAVING DECREASED DRYING TIMES

BACKGROUND OF THE INVENTION

1. Field of the Invention

This invention relates to an ink composition, and more particularly, to an ink composition suitable for ink jet printing.

2. Description of Related Art

Many types of printing inks have been developed for satisfying a variety of purposes. For some applications, it is desirable to provide an ink which provides superior printing qualities. Generally, these inks have a high surface tension and are relatively slow drying. For other applications, it is desirable to provide an ink which is fast drying. These inks typically have a lower surface tension than the slow drying inks, and tend to wick unevenly (feather) when printed on paper, resulting in poor print quality.

In some applications of printing with inks, the drying time of images is a significant characteristic to consider. In particular, in printing processes such as ink jet printing, the drying of the ink can be particularly critical. For example, it may be desirable to provide fast drying inks for increasing throughput. However, fast drying inks typically provide poor print quality because of feathering. Further, inks may clog the nozzles of the ink jet because of the speed at which water evaporates from the nozzles.

Slow drying inks, while providing good print quality, put constraints on the design and the speed of ink jet printers. Therefore, there is a need for ink formulations which are fast drying while still maintaining good print quality. Good print quality is usually achievable with inks that have a high surface tension (greater than 50 dynes/cm) and are slow drying (greater than 20 seconds on most plain papers).

In addition to providing good print quality, it is also desirable that an ink have good jetting characteristics without deterioration of the ink jet nozzles. The deterioration of the ink jet nozzles may be described in terms of the ink's latency. Latency, as used herein, refers to the maximum time period, usually less than an hour and most often less than 10 minutes, over which an uncapped ink-jet printhead can remain idle before noticeable deterioration of its jetting performance.

U.S. Pat. No. 4,530,961 to Nguyen et al. discloses a low viscosity stable aqueous dispersion of graft carbon black for manufacturing ink compositions. An aqueous dispersion of carbon black is grafted with hydrophilic monomers such as alkali or ammonium carboxylate bearing polymers. In preparing the grafted carbon black, a peroxidation step is performed which may be carried out in the presence of a free radical polymerization accelerator such as an amine accelerator. One of the disclosed accelerators is TRIS-TEMED, tris-(hydroxymethyl)-aminomethane-N-tetraethylethylene diamine.

U.S. Pat. No. 4,154,618 to Burke discloses coating compositions useful for inks which provide films which are water-resistant and which have excellent wet/dry rub resistance. The coating compositions comprise acidic resins, a metal-polyamine complexer, and optional organic acids and cometals. The acidic resins may be derived from amine or blocked amine alcohols such as tris(hydroxymethyl)aminomethane and triethanolamine.

While many types of inks are available, it is desirable to provide improved ink compositions which are fast drying while also maintaining good print quality.

SUMMARY OF THE INVENTION

It is an object of the invention to decrease the drying times of ink compositions while maintaining good print quality.

Another object of the invention is to improve the latency of ink compositions while maintaining good print quality.

These and other objects of the invention are achieved with an ink composition containing as an additive meso-erythritol or a compound represented by $RC(CH_2OH)_3$ wherein R is a member selected from alkyl and $-NH_2$. Preferred additives of the invention are selected from the group consisting of tris(hydroxymethyl)aminomethane, 1,1,1-tris(hydroxymethyl)ethane, meso-erythritol, and salts thereof.

DESCRIPTION OF PREFERRED EMBODIMENTS

The present invention provides ink compositions which have reduced drying times and improved latency while maintaining good print quality. In particular, the ink compositions of the present invention include as an additive meso-erythritol or a compound represented by $RC(CH_2OH)_3$ wherein R is an alkyl or $-NH_2$. The alkyl may have from 1 to about 5 carbon atoms and may be substituted or unsubstituted. The alkyl should not render the additive water-insoluble. Examples of the alkyl include methyl, ethyl, propyl and the like. Preferred additives include tris(hydroxymethyl)aminomethane, 1,1,1-tris(hydroxymethyl)ethane, meso-erythritol or salts thereof. The addition of tris(hydroxymethyl)aminomethane to ink compositions reduces the drying times of the ink compositions without affecting surface tension, and also allows for the adjustment of the pH of the composition.

Generally, the ink compositions of the present invention comprise a colorant, an ink vehicle and at least one of the above-described additives. The ink compositions of the invention preferably can be used in ink jet printing systems.

Inks generally used in an ink jet printing system preferably comprise inks which are capable of being utilized without clogging or leaking in either the type of printing system which uses thermal energy to produce a vapor bubble in an ink-filled channel to expel a drop of ink, or the type of system which uses a piezoelectric transducer to produce a pressure pulse that expels droplets from a nozzle. Known ink jet inks generally comprise a dye as the colorant which is soluble in an ink vehicle such as water or a mixture comprising water and a water soluble or water miscible organic solvent. The colorant, however, may be any material which permits the development of visible, ultraviolet or infrared readable images on a recording medium such as paper. The colorant may include direct dyes, acid dyes, reactive dyes, polymeric dyes, and the like.

Any of a number of various ink vehicles may be employed. Generally, however, the ink vehicle contains water, more preferably deionized water, as the primary component. The ink vehicle may also contain cosolvents and/or additives which modify the properties of the ink composition such as, for example, to adjust viscosity, surface tension, drying time, jettability through improved latency, etc.

In addition to the colorant and ink vehicle, the ink compositions of the present invention contain a member selected from meso-erythritol and a compound represented by $RC(CH_2OH)_3$, wherein R is alkyl, or $-NH_2$ or salts thereof. Specific preferred examples of compounds represented by $RC(CH_2OH)_3$ include tris(hydroxymethyl)aminomethane and 1,1,1-tris(hydroxymethyl)ethane. Mesoerythritol has a molecular structure

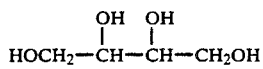

Tris(hydroxymethyl)aminomethane has a molecular structure

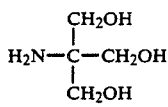

1,1,1-tris(hydroxymethyl)ethane has a molecular structure

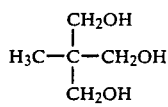

In describing the additives of the present invention, specific reference will be made to one of the preferred additives, tris(hydroxymethyl)aminomethane.

The addition of tris(hydroxymethyl)aminomethane (hereinafter referred to as THAM) and/or salts thereof reduces the drying time of the ink composition without affecting the surface tension of the ink. The drying time may be reduced by as much as a factor of 2. THAM can improve the drying times of both relatively slow drying inks which take more than 20 seconds to dry, as well as relatively fast drying inks which dry in less than one second.

THAM salts include, for example, citrates, maleates, carbonates, oxalates, phosphates, hydrochlorides, succinates, phosphate EDTA, acetates, benzoates, nitrates, and the like. THAM salts are available from Sigma Chemical Company under the line of TRIZMA compounds. These TRIZMA compounds include TRIZMA carbonate, TRIZMA citrate, TRIZMA maleate, TRIZMA phosphate, TRIZMA succinate, TRIZMA hydrochloride, TRIZMA acetate, TRIZMA benzoate, and TRIZMA nitrate. Other materials having similar characteristics include, for example, 1,1,1-tris(hydroxymethyl)ethane, meso-erythritol, and the like, described above.

The amount of THAM present in the ink compositions of the present invention is preferably in the range of about 0.1% by weight to about 8.0% by weight and more preferably in the range of about 1.0% by weight to about 5.0% by weight based on weight of the ink composition. Addition of THAM in an amount less than about 0.1% by weight does not produce a significant reduction of the drying times, while addition of amounts greater than about 8.0% by weight increases viscosity to an unacceptable level, reducing the maximum jetting frequency of the ink. Increasing viscosity also tends to increase the drying time of the ink.

In addition to improving the drying times, THAM also functions as a buffer in the ink compositions of the present invention for maintaining the pH in the range of about 7 to about 9. This pH range is desirable because it minimizes corrosion of the nozzles and heater components in an ink jet printer. To control the pH of the ink compositions, a THAM salt such as THAM hydrochloride can be added with THAM to produce any desired pH between about 7 and 9. Generally, the more hydrochloride that is present in the composition, the lower the pH will be. This permits the preparation of fast drying inks which are buffered.

Slow drying ink compositions generally contain a colorant, deionized water, a humectant and optionally a surfactant. By "slow drying" is meant inks which take more than about 10 seconds to dry on most plain papers. Of course, when determining drying times, the properties of the recording medium on which the ink is applied, e.g., the paper, must be taken into consideration. A variety of papers are known having different compositions which will affect drying times. In particular, additives in papers, for example sizing agents, will affect the drying time of the ink. Further, the surface properties of each side of a piece of paper may be different. Papers contain two surfaces often referred to as the wire side and the felt side. The drying time of the ink composition will be affected by the side of paper on which the ink is applied.

Fast drying inks generally comprise a colorant, water, an organic cosolvent, a surfactant and a humectant. Fast drying inks are characterized herein as ink compositions which dry in less than about 2 seconds on most plain papers.

Generally, the ink compositions of the invention may contain about 60% to about 99.8% by weight of the ink vehicle, about 0.1% to about 8% by weight, preferably about 1% to about 6% by weight, of the colorant, about 0.1% to about 8.0% by weight of meso-erythritol, $RC(CH_2OH)_3$ or salts thereof, and about 0.01% to about 5% by weight of other additives.

The ink vehicle of the invention is the major component of the composition and may make up about 60% to about 99% by weight of the total ink composition. The ink vehicle is generally deionized water and may include one or more cosolvents and humectants. These may be a water miscible organic solvent. Suitable water miscible organic solvents include ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, diethylene glycol monobutyl ether, cellusolve, ether derivatives, amino alcohols, ketones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50. The non-water component of the liquid vehicle generally serves as a humectant which has a boiling point higher than that of water (100° C.). Heterophase ink jet inks are also known.

The colorant may be present in an amount from about 0.1% to about 8.0% by weight based on weight of the ink composition. The colorant is preferably a dye. Generally, any effective dye, such as one of the direct dyes or the acid dyes, can be selected as the colorant, provided that it is compatible with the other ink components and is soluble in the ink vehicle. Examples of suitable dyes include anthraquinones, monoazo dyes, disazo dyes, triazo dyes, phthalocyanines, aza(18)-annulenes, and formazan copper complexes. Particular dyes which may be used in the ink compositions of the invention include, for example, Food Black #2, Reactive Black 31, Direct Black 168, Direct Black 154, Reactive Red 180, Acid Blue 9, Direct Blue 86, Direct Blue 199, Acid Yellow 23, Acid Red 249, and the like.

As discussed above, the ink compositions of the present invention may also include additives in addition to the colorant, ink vehicle and meso-erythritol, RC ($CH_2OH)_3$ or salts thereof. For example, the ink compositions of the present invention may include a humectant. A humectant is a hygroscopic substance which is used to ensure the absorption of a certain amount of atmospheric moisture. Humectants are added to help prevent the ink from drying within the ink jet nozzles of a printer and therefore affect the latency of the ink. Humectants may include, for example, glycerol, thiodiglycols, for example, thiodiethanol, ethylene glycol, diethylene glycol and the like, glycols, and 2-pyrrolidinone. The humectant may be present in the ink compositions in an amount ranging from about 1.0% to about 50% by weight and more preferably in an amount from about 4% to about 40% by weight based on weight of the total ink composition.

Polymeric additives can also be added to inks to enhance their viscosity. Such additives include water soluble polymers such as gum arabic, polyacrylate salts, polymethacrylate salts, polyvinyl alcohols, hydroxy propylcellulose, hydroxyethylcellulose, polyvinylpyrrolidinone, polyethyleneimine copolymers with ethylene oxide or propylene oxide such as Discole N-518 available from DKS International Inc., and those disclosed in copending Application Ser. No. 07/701,242 (Attorney Docket No. JAO 26703), filed simultaneously herewith, polyvinylether, starch, polysaccharides, and the like. Polymeric additives may be present in inks in amounts of from 0 to about 10 percent by weight, and preferably from about 0.01 to about 5.0 percent by weight. Other polymeric additives may be added to increasing waterfastness, such as those, for example, disclosed in U.S. Pat. Nos. 4,789,400 and 4,659,382.

Other optional additives to inks include biocides such as Dowicil 150, 200, and 75, benzoate salts, sorbate salts, and the like, present in an amount of from about 0.0001 to about 4 percent by weight, and preferably from about 0.01 to about 0.5 percent by weight, humectants and penetration control additives such as ethylene glycol, diethyleneglycol, N-methylpyrrolidinone, propylene glycol, hydroxyethers, ethers, amides, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight; pH controlling agents such as acids or bases, phosphate salts, carboxylate salts, sulfate salts, amine salts and the like, present in an amount of from 0 to about 1 percent by weight and preferably from about 0.01 to about 1 percent by weight, or the like.

Inks can be prepared by any process suitable for preparing aqueous-based inks. For example, the ink ingredients can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the ink composition generally is filtered to remove any solid or particulate matter. Any other suitable processes for preparing inks can also be employed.

The invention will further be illustrated in the following, non-limiting examples, it being understood that these examples are intended to be illustrative only and that the invention is not intended to be limited to the materials, conditions, process parameters, and the like recited herein.

COMPARATIVE EXAMPLE 1

A slow drying ink composition is formulated. The ink composition comprises 3.00% Food Black #2, 5.25% diethylene glycol, 4.00% Discole N-518 (a polyethyleneimine-ethylene oxide-propylene oxide block copolymer, available from DKS International Inc.), 0.005% Dowicil 200 (an antimicrobial agent (1-(3-chlorallyl)-3,5,7-triaza-1-azoniaodamantame chloride available from Dow Chemical), and 87.70% deionized water by weight. The pH was adjusted to 9.0 with hydrochloric acid.

EXAMPLE 2

An ink composition is formulated containing the same components as in Comparative Example 1 except that 2.00% of the deionized water is replaced with 2.00% tris(hydroxymethyl)aminomethane.

COMPARATIVE EXAMPLE 3

A fast dying ink composition is formulated containing 3.0% Food Black #2, 10.2% diethylene glycol monobutyl ether, 4.8% glycerol, and 82.0% deionized water.

EXAMPLE 4

An ink composition is formulated as in Comparative Example 3 except that 2.00% of the deionized water is replaced with 2.00% tris(hydroxymethyl)aminomethane.

COMPARATIVE EXAMPLE 5

A slow drying ink composition is formulated containing 3.0% by weight Food Black #2, 5.25% by weight diethylene glycol and 91.75% by weight deionized water.

EXAMPLE 6

An ink composition is formulated as in Comparative Example 5 except that 4.0% by weight of the deionized water is replaced with 4.0% tris(hydroxymethyl) aminomethane.

Results

The drying times of the ink compositions described in Comparative Example 1 and Example 2 are obtained by measuring the time elapsed between printing the ink with an ink jet printer on paper and the time at which the ink can be rubbed with a cotton swab without inducing smearing of the ink. The drying times of the ink compositions of Comparative Example 3 and Example 4 are measured using a standard procedure which involves determining the speed of penetration of a 20 microliter droplet of ink into a piece of paper. The paper is suspended horizontally such that the area of interest is not in contact with anything on either side of the paper. The value is then normalized to 80 picoliters which is the average size of a thermal ink jet drop. The drying times of Comparative Example 5 and Example 6 are obtained by printing the ink with an ink jet printer, and using a heated platen at 110°–115° C. in order to assist drying, and then measuring the minimum amount of time to achieve no paper to paper offset.

Drying times of the ink compositions are obtained on two different papers, Champion Courtland 4024 paper (C.C.) available from Champion International Corp. and Sanyo-L paper available from Sanyo Inc. Sanyo-L paper is a lower sized paper than the Champion Courtland paper. The drying times are reported in the following Table.

TABLE

| | Drying Times of Ink Compositions | |
|---|---|---|
| Examples | Paper | Drying Time (sec) |
| 1 (control) | C.C. (wire side) | 22 |
| 2 | C.C. (wire side) | 13 |
| 1 (control) | C.C. (felt side) | 20 |
| 2 | C.C. (felt side) | 11 |
| 3 (control) | Sanyo-L (wire side) | 0.38 |
| 4 | Sanyo-L (wire side) | 0.34 |
| 5 (control) | C.C. (felt side) | 31 |
| 6 | C.C. (felt side) | 22 |

The above results indicate that the compositions of the invention decrease the drying time of the slow drying ink on Champion Courtland paper by approximately 40%. The drying time of the fast drying ink is decreased by approximately 10% on Sanyo-L paper.

While the invention has been described with reference to particular preferred embodiments, the invention is not limited to the specific examples given. Other embodiments and modifications can be made by those skilled in the art without departing from the spirit and scope of the invention.

What is claimed is:

1. A fast drying, good print quality ink composition, comprising a colorant, an ink vehicle and an effective amount of at least one additive to control drying times of the ink composition, said additive being selected from the group consisting of meso-erythritol, $RC(CH_2OH)_3$ salts of meso-erythritol, and salts of $RC(CH_2OH_3$, said salts being selected from the group consisting of organic and inorganic salts, wherein R is a member selected from the group consisting of —$NH_2$ and alkyl.

2. The ink composition of claim 1, wherein said additive is selected from the group consisting of tris(hydroxymethyl)aminomethane and salts of said tris(hydroxymethyl)aminomethane, said salts being selected from the group consisting of organic and inorganic salts.

3. The ink composition of claim 1, wherein the ink vehicle comprises water.

4. The ink composition of claim 1, wherein the ink vehicle comprises water and a cosolvent, said cosolvent being selected from the group consisting of water soluble and water miscible organic solvents.

5. The ink composition of claim 1, wherein said additive is present in an amount from about 0.1% to about 8.0% by weight of the ink composition.

6. The ink composition of claim 1, wherein said additive is present in an amount from about 1.0% to about 5.0% by weight of the ink composition.

7. The ink composition of claim 2, wherein said tris(hydroxymethyl)aminomethane salt is selected from the group consisting of hydrochlorides, succinates, carbonates, phosphates, maleates and oxalates.

8. The ink composition of claim 1, further comprising a humectant.

9. The ink composition of claim 1, wherein said colorant is selected from the group consisting of direct dyes, acid dyes, reactive dyes and polymeric dyes.

10. The ink composition of claim 1, wherein said colorant is at least one dye selected from the group consisting of Food Black #2, Direct Black 168, Direct Black 154, Reactive Black 31, Reactive Red 180, Acid Blue 9, Acid Yellow 23, Direct Blue 199, and Direct Blue 86.

11. The ink composition of claim 8, wherein the humectant is selected from the group consisting of glycerol, ethylene glycol and diethylene glycol.

12. The ink composition of claim 1, wherein said additive is a mixture of tris(hydroxymethyl)aminomethane and tris(hydroxymethyl)aminomethane hydrochloride.

13. The ink composition of claim 1, having a pH from about 7 to about 9.

14. A fast drying, good print quality ink composition comprising a colorant, an ink vehicle and an effective amount of at least one additive to control drying times of the ink composition, said additive selected from the group consisting of tris(hydroxymethyl)aminomethane, 1,1,1-tris(hydroxymethyl) ethane, meso-erythritol, salts of tris(hydroxymethyl)aminomethane, salts of 1,1,1-tris(hydroxymethyl) ethane, and salts of meso-erythritol, said salts being selected from the group consisting of organic and inorganic salts.

15. The ink composition of claim 14, wherein said member is present in an amount ranging from about 0.1% to about 8.0% by weight based on weight of the total composition.

16. The ink composition of claim 14, comprising:
0.1% to about 8% by weight of said colorant;
about 10% to about 99.8% by weight of said ink vehicle; and
about 0.1% to about 8.0% by weight of said at least one member selected from the group consisting of tris(hydroxymethyl)aminomethane, 1,1,1-tris(hydroxymethyl) ethane, meso-erythritol, salts of tris(hydroxymethyl)aminomethane, salts of 1,1,1-tris(hydroxymethyl) ethane, and salts of meso-erythritol, said salts being selected from the group consisting of organic and inorganic salts.

17. The ink composition of claim 14, wherein said ink vehicle comprises water and a cosolvent.

18. The ink composition of claim 15, wherein said cosolvent is an organic solvent selected from the group consisting of diethylene glycol monobutyl ether, ethylene glycol and diethylene glycol.

19. The ink composition of claim 14, comprising about 1.0% to about 5.0% by weight of said tris(hydroxymethyl)aminomethane or salts thereof.

* * * * *

REEXAMINATION CERTIFICATE (2271st)

United States Patent [19]

Pontes et al.

[11] B1 5,100,469

[45] Certificate Issued Apr. 12, 1994

[54] INK COMPOSITIONS HAVING DECREASED DRYING TIMES

[75] Inventors: Fatima M. Pontes; Marcel P. Breton; Raymond W. Wong, all of Mississauga; Kerstin Henseleit, Toronto; Melvin D. Croucher, Oakville, all of Canada

[73] Assignee: Xerox Corporation, Stamford, Conn.

Reexamination Request:
No. 90/003,205, Sep. 24, 1993

Reexamination Certificate for:
Patent No.: 5,100,469
Issued: Mar. 31, 1992
Appl. No.: 701,272
Filed: May 16, 1991

[51] Int. Cl.$^5$ .............................................. C09D 11/02
[52] U.S. Cl. ................................ 106/20 D; 106/22 R; 106/25 R
[58] Field of Search ................. 106/20 R, 22 R, 22 F, 106/23 R, 23 F, 25 R, 20 D

[56] References Cited
FOREIGN PATENT DOCUMENTS
52-012037  1/1977  Japan .

*Primary Examiner*—Helene Klemanski

[57] ABSTRACT

An ink composition which is especially useful for ink jet printing contains a colorant, a liquid carrier and at least one additive selected from the group consisting of meso-erythritol, $RC(CH_2OH)_3$ and salts thereof, wherein R is a member selected from the group consisting of $NH_2$ and alkyl.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 14 and 16 are determined to be patentable as amended.

Claims 2-13, 15 and 17-19, dependent on an amended claim, are determined to be patentable.

New claims 20-23 are added and determined to be patentable.

1. A fast drying, good print quality ink composition, comprising a colorant, an ink vehicle and an effective amount of at least one additive to control drying times of the ink composition, said additive being selected from the group consisting of [meso-erythritol,] $RC(CH_2OH)_3$, salts of meso-erythritol, and salts of [$RC(CH_2OH_3)$] $RC(CH_2OH)_3$, said salts being selected from the group consisting of organic and inorganic salts, wherein R is a member selected from the group consisting of $-NH_2$ and alkyl.

14. A fast drying, good print quality ink composition, comprising a colorant, an ink vehicle and an effective amount of at least one additive to control drying times of the ink composition, said additive *being* selected from the group consisting of tris(hydroxymethyl)aminomethane, 1,1,1-tris(hydroxymethyl)ethane, [meso-erythritol,] salts of tris(hydroxymethyl)aminomethane, salts of 1,1,1-tris(hydroxymethyl) ethane, and salts of meso-erythritol, said salts being selected from the group consisting of organic and inorganic salts.

16. The ink composition of claim 14, comprising:
0.1% to about 8% by weight of said colorant;
about 10% to about 99.8% by weight of said ink vehicle; and
about 0.1% to about 8.0% by weight of said at least one member selected from the group consisting of tris(hydroxymethyl)aminomethane, 1,1,1-tris(hydroxymethyl)ethane, [meso-erythritol,] salts of tris(hydroxymethyl)aminomethane, salts of 1,1,1-tris(hydroxymethyl)ethane, and salts of meso-erythritol, said salts being selected from the group consisting of organic and inorganic salts.

*20. The ink composition of claim 1, wherein R is $-NH_2$ or an alkyl radical having from 1 to 5 carbon atoms.*

*21. The ink composition of claim 1, wherein R is $-NH_2$, methyl, ethyl, or propyl.*

*22. The ink composition of claim 14, wherein R is $-NH_2$ or an alkyl radical having from 1 to 5 carbon atoms.*

*23. The ink composition of claim 14, wherein R is $-NH_2$, methyl, ethyl, or propyl.*

* * * * *